US007010558B2

(12) United States Patent
Morris

(10) Patent No.: US 7,010,558 B2
(45) Date of Patent: Mar. 7, 2006

(54) DATA PROCESSOR WITH ENHANCED INSTRUCTION EXECUTION AND METHOD

(75) Inventor: Chris Morris, Wembley (GB)

(73) Assignee: ARC International, Elstree (GB)

( * ) Notice: Subject to any disclaimer, the term of this patent is extended or adjusted under 35 U.S.C. 154(b) by 654 days.

(21) Appl. No.: 10/125,816

(22) Filed: Apr. 18, 2002

(65) Prior Publication Data

US 2002/0194236 A1 Dec. 19, 2002

Related U.S. Application Data

(60) Provisional application No. 60/285,456, filed on Apr. 19, 2001.

(51) Int. Cl.
*G06F 17/14* (2006.01)
(52) U.S. Cl. ...................... 708/409; 708/523
(58) Field of Classification Search ................ 708/409, 708/523, 501; 712/221
See application file for complete search history.

(56) References Cited

U.S. PATENT DOCUMENTS

| | | |
|---|---|---|
| 4,117,541 A | 9/1978 | Ali |
| 4,293,921 A | 10/1981 | Smith, Jr. |
| 4,486,850 A | 12/1984 | Hyatt |
| 4,722,050 A | 1/1988 | Lee et al. |
| 4,763,242 A | 8/1988 | Lee et al. |
| 4,791,590 A | 12/1988 | Ku et al. |
| 4,891,779 A | 1/1990 | Hasebe |
| 4,996,661 A | 2/1991 | Cox et al. |
| 5,042,000 A | 8/1991 | Baldwin |
| 5,053,987 A | 10/1991 | Genusov et al. |
| 5,093,801 A | 3/1992 | White et al. |
| 5,224,063 A | 6/1993 | Matsunaga |
| 5,303,172 A | 4/1994 | Magar et al. |
| 5,450,553 A | 9/1995 | Kitagaki et al. |
| 5,477,478 A | 12/1995 | Okamoto et al. |
| 5,481,488 A | 1/1996 | Luo et al. |
| 5,721,892 A | 2/1998 | Peleg et al. |
| 5,764,553 A | 6/1998 | Hong |
| 5,941,940 A * | 8/1999 | Prasad et al. ............... 708/523 |
| 5,954,811 A | 9/1999 | Garde |
| 5,968,112 A | 10/1999 | Kirschenbaum et al. |
| 5,983,256 A | 11/1999 | Peleg et al. |
| 6,006,245 A | 12/1999 | Thayer |
| 6,032,253 A | 2/2000 | Cashman et al. |
| 6,061,705 A | 5/2000 | Hellberg |
| 6,081,821 A | 6/2000 | Hopkinson et al. |
| 6,209,017 B1 | 3/2001 | Lim et al. |
| 6,272,512 B1 | 8/2001 | Golliver et al. |
| 6,282,633 B1 | 8/2001 | Killian et al. |
| 6,317,770 B1 | 11/2001 | Lim et al. |

(Continued)

*Primary Examiner*—D. H. Malzahn
(74) *Attorney, Agent, or Firm*—Gazdzinski & Associates

(57) ABSTRACT

An apparatus and method for performing enhanced algorithmic processing, including reduced cycle-count fast Fourier transform (FFT) calculations. In one aspect, the invention comprises a user-configurable processor having an extension instruction adapted for reduced cycle-count algorithmic operations. In one exemplary embodiment, the processor is an extensible core, and the extension instruction comprises a 32-bit instruction word linked with existing circuitry in the processor core used for multiply-accumulate (mac) instructions. 16-bit, 24-bit, and dual 16-bit multiply options are available for the multiply/accumulate unit of the processor. The extension instruction is pipelined to the same number of stages as the mac instructions, thereby avoiding unnecessary stalls and increasing performance. A modified accumulator data path used in support of the foregoing instruction is also described. A computer program and apparatus for synthesizing logic implementing the aforementioned functionality are also described.

31 Claims, 13 Drawing Sheets

U.S. PATENT DOCUMENTS

| | | |
|---|---|---|
| 6,341,299 B1 | 1/2002 | Romain |
| 6,359,938 B1 | 3/2002 | Keevill et al. |
| 6,366,936 B1 | 4/2002 | Lee et al. |
| 6,366,937 B1 | 4/2002 | Shridhar et al. |
| 6,477,683 B1 | 11/2002 | Killian et al. |
| 6,477,697 B1 | 11/2002 | Killian et al. |
| 6,625,630 B1 | 9/2003 | Vinitzky |
| 6,701,515 B1 | 3/2004 | Wilson et al. |
| 6,718,504 B1 | 4/2004 | Coombs et al. |
| 6,732,238 B1 | 5/2004 | Evans et al. |
| 6,763,327 B1 | 7/2004 | Songer et al. |
| 6,848,074 B1 | 1/2005 | Coombs |
| 6,854,046 B1 | 2/2005 | Evans et al. |
| 6,862,563 B1 | 3/2005 | Hakewill et al. |
| 2003/0009502 A1* | 1/2003 | Katayanagi ............... 708/622 |
| 2004/0010321 A1 | 1/2004 | Morishita et al. |

* cited by examiner

FIG. 7

| | | | | | | | | | |
|---|---|---|---|---|---|---|---|---|---|
| | | | | | | | | | NO WRITE BACK |
| | | | | | | | WRITE BACK TO XY MEMORY | NO WRITE BACK | |
| | | | | | FIRST INSTRUCTION IN LOOP. | WRITE BACK TO XY MEMORY | SATURATE AND ROUND RESULT | | |
| | | | LAST INSTRUCTION FROM PREVIOUS PASS | NO WRITE BACK | SATURATE AND ROUND RESULT | SET FLAG; RESULT = 2*S1$_{old}$ – ACC; | FLAG SET SO SWAP AND RESET FLAG THEN ADD | | |
| | | WRITE BACK TO XY MEMORY | NO WRITE BACK | ADD TO ACCUMUL-ATOR | WAIT | GET INPUT VALUES FIX OUT ADDR | MULTIPLY: +B$_i$Sinθ, –B$_r$Sinθ | | |
| | SATURATE AND ROUND RESULT | FLAG SET SO SWAP AND RESET FLAG THEN ADD | MULTIPLY: +B$_i$Cosθ, B$_r$Cosθ | GET INPUT VALUES FIX OUT ADDR | INSTRUCTION FETCH MAC | | | | |
| SET FLAG; RESULT = 2*S1$_{old}$ – ACC; | MULTIPLY: +B$_i$Sinθ, –B$_r$Sinθ | GET INPUT VALUES FIX OUT ADDR | INSTRUCTION FETCH FBF | | | | | | |
| WAIT | GET INPUT VALUES FIX OUT ADDR | INSTRUCTION FETCH MAC | | | | | | | |
| GET INPUT VALUES FIX OUT ADDR | INSTRUCTION FETCH MAC | | | | | | | | |

NEW INSTRUCTION AND LAST IN LOOP.

DATA PROCESSOR WITH ENHANCED INSTRUCTION EXECUTION AND METHOD

The present application claims priority to U.S. Provisional Patent Application Ser. No. 60/285,456, entitled "Data Processor With Enhanced Instruction Execution and Method" filed Apr. 19, 2001.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

This invention relates generally to data processing, and more particularly to the processing of algorithms in software that benefit from efficient implementation of "butterfly" operations such as for example those used in Fast Fourier Transform (FFT) calculations.

2. Description of Related Technology

The fast Fourier transform (FFT) is a commonly used algorithm that efficiently converts from a time domain to a frequency domain representation of a signal. Uses include spectral analysis, signal compression and filtering. The number of cycles taken to perform an FFT on a particular processor is commonly quoted as a measure of that processor's efficiency.

At the heart of the aforementioned FFT calculation is a sequence of operations commonly known as a "butterfly". The calculation has three inputs (A0, B0, and the so-called "twiddle factor"), and two outputs (A1, B1), as shown diagrammatically in FIG. 1a. The inputs and outputs are all complex, and A1, B1 replace A0, B0 respectively in the block of data being transformed. A complex multiplication, a complex addition and a complex subtraction are involved. The loading and storing of operands and resulting values may occur in parallel by virtue of the XY memory window registers. The twiddle factor may be obtained in any number of ways, such as from a table in the illustrated embodiment. The twiddle factor is generally of the form $\cos\theta + j \cdot \sin\theta$, where "j" denotes a complex value. In the case of the decimation in time (DIT), complex, in place FFT, pairs of blocks are operated on with the "A" and "B" values coming sequentially from different blocks. The number of pairs of blocks doubles on each of log2(N) iterations (for an "N" point FFT calculation). FIG. 1b shows the grouping of butterflies for an 8-point FFT. Note that the value of "N" is usually much greater than 8; however, the fundamental principles involved are identical regardless of the value of N chosen.

Accordingly, an FFT algorithm can be coded using a triple nested loop of the type well known in the programming arts. The outer loop of the triple nested loop repeats log2(N) times. In the case of the 8-point example of FIG. 1b, this value would equal 3. The inner loop of the triple nested loop performs a single butterfly operation. The middle loop of the triple nested loop repeats for each pair of groups ($2^{k-1}$ times for the kth pass) and thus operates differently on each iteration. The twiddle factor remains the same for each group of butterflies. The twiddle factor is also the same for all the butterflies in the first pass (i.e., $e^0=1$), takes two different values in the second pass, and so forth. The twiddle factor may be loaded into processor core registers (such as from the aforementioned twiddle factor table) in the middle loop of the triple nested loop. The following exemplary code can be used to perform the butterfly calculation in an extensible processor:

| | |
|---|---|
| mul 0,%r9,%x1__nu | ;−Br cosT |
| mac %xmac0,%r8,%y1__nu | ;−Bi sinT |
| mul 0,%r9,%y1__nu | ;−Bi cosT |
| mac %xmac1,%r7,%x1__nu | ;+Br sinT |
| adds %x1__u,%x0__nu,%xmac0 | ;Subtract and store to Re(B) |
| subs %x0__u,%x0__nu,%xmac0 | ;Add and store to Re(A) |
| adds %y1__u,%y0__nu,%xmac1 | ;Subtract and store to Im(B) |
| subs %y0__u,%y0__nu,%xmac1 | ;Add and store to Im(A) |

©2001–2002 ARC International (UK) Limited. All rights reserved.

The multiply (MUL) and multiply accumulate (MAC, XMAC) operations of the foregoing code example take longer than normal instructions to complete. This means that the processor will stall (i.e. new instructions will not enter the pipeline) for up to 3 cycles (24-bit case) or 2 cycles (16-bit case) under certain conditions. Hence, a single butterfly calculation may take 8 or more cycles to complete. This is a less than optimal situation from a performance standpoint.

Based on the foregoing, there is a need to provide an improved configuration adapted to reduce the computation time (and particularly, the number of cycles used) for executing the butterfly operations in software. Such reduced computation time would be provided without reducing the maximum clock speed or otherwise utilizing multi-operand instruction slot(s). This improved configuration would also be readily implemented in existing processor instruction set architectures (ISAs) so as to minimize the changes necessary thereto. Furthermore, this improved configuration would ideally be adapted to utilize silicon-efficient hardware (including memory), thereby keeping the size of the processor to a minimum.

SUMMARY OF THE INVENTION

The present invention satisfies the aforementioned needs by providing an automated data processor with enhanced instruction execution, and methods associated therewith.

In a first aspect of the invention, an improved configurable, extensible data processor is provided which is adapted to perform processing of algorithms or other operations with a reduced cycle count. In one exemplary embodiment, the processor comprises an extensible reduced instruction set (RISC) processor core which incorporates an extension arithmetic logic unit (ALU) and a 32-bit instruction word and registers. The ALU may be adapted to multiply two 16-bit words, two 24-bit words, or two lots of two 16-bit words (thereby generating two results), depending on the configuration desired by the designer. The instruction set of the processor core further includes a specialized extension instruction adapted for performing "butterfly" calculations associated with fast Fourier transforms (FFTs), such that the cycle count for performing these calculations is greatly reduced over prior art approaches without reducing the maximum clock speed or otherwise utilizing multi-operand instruction slot(s). The specialized instruction is advantageously linked with existing multiply-accumulate instruction circuitry, and has the same latency as the other such instructions. The "dual" 16-bit embodiment of the ALU, coupled with certain hardware modifications, allows further improvement in the overall cycle count by reducing the FFT butterfly operation to three cycles.

In a second aspect of the invention, an improved method of performing a loop calculation within a multi-cycle iterative calculation (such as the aforementioned FFT butterfly) on an extensible processor is disclosed. The method generally comprises providing at least one multiply-accumulate stage having at least one accumulator associated therewith; providing at least one extension instruction (e.g., "FBF") within the instruction set of the processor, the at least one extension instruction being adapted to (i) subtract a value present in the at least one accumulator from a multiple of a first input value, and (ii) preload the at least one accumulator with a second input value; and writing back the result of the aforementioned subtraction operation to a designated register location using existing pipeline multiply/multiply-accumulate logic. In one exemplary embodiment of the method, the extension instruction comprises a two-operand instruction.

In a third aspect of the invention, an improved method of performing a multi-cycle calculation, such as the aforementioned FFT butterfly, within an extensible processor is disclosed. The method generally comprises providing at least one multiply-accumulate stage having at least one accumulator associated therewith; providing at least one extension instruction within the instruction set of the processor, the at least one extension instruction being adapted to perform loop calculations, and pipelined to the same number of stages as the extension multiply-accumulate (XMAC) instructions of the instruction set so as to avoid stalling of the pipeline during execution; providing a plurality of inputs to said processor; and executing the extension instruction repeatedly to produce the desired result of the multi-cycle calculation in a minimum number of cycles using the at least one accumulator.

In a fourth aspect of the invention, an improved method of manufacturing a processor adapted for performing multi-cycle calculations is disclosed. In one exemplary embodiment, the multi-cycle calculation comprises an FFT butterfly, and the method comprises writing an extension instruction (e.g., FBF instruction) in a hardware description language (HDL); adding the extension instruction to the design of extended data processor; synthesizing the extended processor design; and generating a software function incorporating the aforementioned instruction.

In a fifth aspect of the invention, an improved accumulator data path configuration used in an extended data processor for performing reduced cycle count operations is disclosed. In one exemplary embodiment associated with "single" 16-bit or 24-bit words, the accumulator configuration comprises an accumulator register; an input multiplexer having a pre-load input; accumulator saturation detection logic; additional subtraction logic, and an output multiplexer. In a second embodiment adapted for use with the aforementioned "dual" 16-bit words, the accumulator configuration further includes a second register adapted to store a previous input value for input during a subsequent multiply operation, and logic which facilitates swapping of the two multiply results during execution of a multiply-accumulate instruction following the "FBF" extension instruction.

In a sixth aspect of the invention, an improved method of synthesizing the design of an integrated circuit incorporating the aforementioned enhanced processing capability is disclosed. In one exemplary embodiment, the method comprises obtaining user input regarding the design configuration; creating a customized HDL functional block description based on the user input and existing libraries of functions; determining a design hierarchy based on the user input and existing libraries; running a makefile to create the structural HDL and script; running the script to create a makefile for the simulator and a synthesis script; and synthesizing and/or simulating the design from the simulation makefile or synthesis script, respectively.

In a seventh aspect of the invention, an improved computer program useful for synthesizing processor designs and embodying the aforementioned enhanced processing capability is disclosed. In one exemplary embodiment, the computer program comprises an object code representation stored on the magnetic storage device of a microcomputer, and adapted to run on the central processing unit thereof. The computer program further comprises an interactive, menu-driven graphical user interface (GUI), thereby facilitating ease of use.

In an eighth aspect of the invention, an improved apparatus for running the aforementioned computer program used for synthesizing gate logic associated with the aforementioned algorithm processing functionality is disclosed. In one exemplary embodiment, the system comprises a stand-alone microcomputer system having a display, central processing unit, data storage device(s), and input device.

BRIEF DESCRIPTION OF THE DRAWINGS

FIG. 7 is logical flow diagram illustrating the operation of the dual 16-bit embodiment of the "FBF" instruction of the invention within the processor pipeline.

DETAILED DESCRIPTION

Figure 1A:
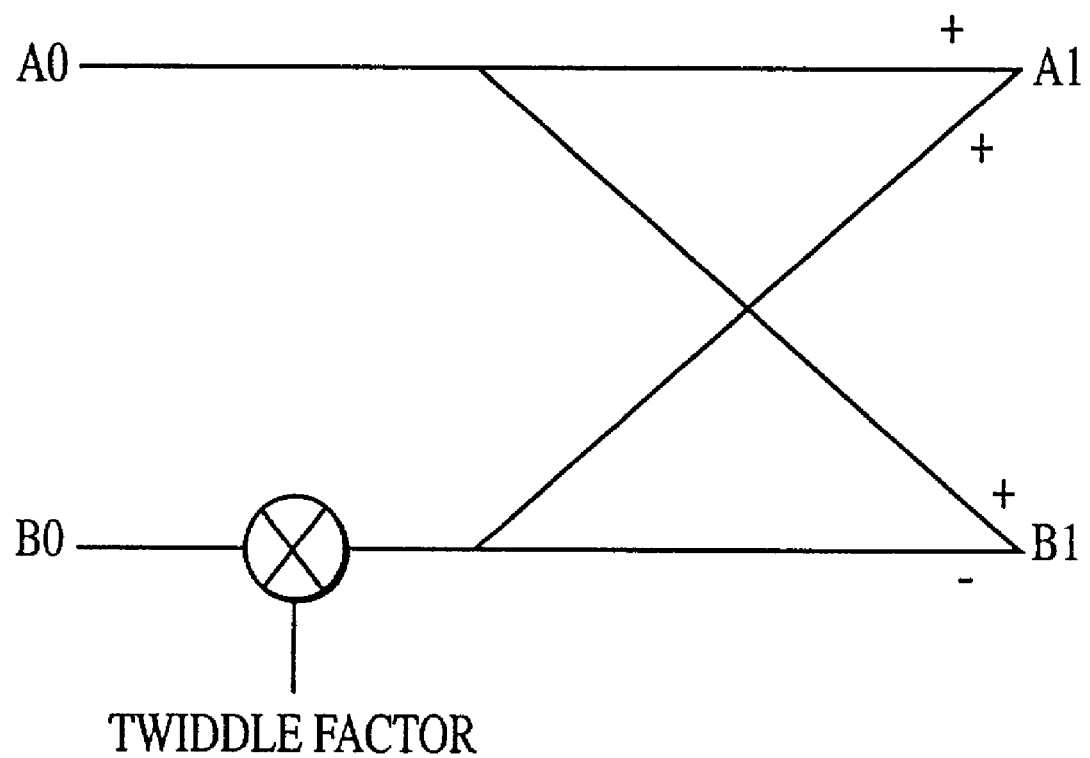
FIG. 1a is a logical diagram illustrating the calculation of the decimation-in-time (DIT) fast Fourier transform (FFT) "butterfly."

Reference is now made to the drawings wherein like numerals refer to like parts throughout.

As used herein, the term "processor" is meant to include any integrated circuit or other electronic device capable of performing an operation on at least one instruction word including, without limitation, reduced instruction set core (RISC) processors such as the ARCtangent™("Tangent") and ARCompact™ ("Compact") user-configurable core manufactured by the Assignee hereof, central processing units (CPUs), and digital signal processors (DSPs). The hardware of such devices may be integrated onto a single piece of silicon ("die"), or distributed among two or more die. Furthermore, various functional aspects of the processor may be implemented solely as software or firmware associated with the processor.

Also as used herein, the terms "extension" and "extensible" refer generally to processor configurations having an additional or extended instruction (or instruction set) adapted to perform specific operations within the processor, such as FFT or Viterbi decode metric calculations. Such an extended instruction (or set) may be user-configurable, or alternatively may be incorporated into the base instruction set of the processor. Hence, these terms are in no way meant to be limiting of the configurability (or lack thereof) of a particular instruction or the instruction set as a whole, but rather merely connote instructions adapted for one or more particular purposes.

Additionally, it will be recognized by those of ordinary skill in the art that the term "stage" as used herein refers to various successive stages within a pipelined processor; i.e., stage 1 refers to the first pipelined stage, stage 2 to the second pipelined stage, and so forth. Such pipeline stages may include, for example, instruction fetch, decode, execute, and writeback stages as is well known in the art.

It is also noted that while the following description is cast in terms of VHSIC hardware description language (VHDL), other hardware description languages (HDL) such as Verilog® may be used to describe various embodiments of the invention with equal success. Furthermore, while an exemplary Synopsys® synthesis engine such as the Design Compiler 2000.05 (DC00) is used to synthesize the various embodiments set forth herein, other synthesis engines such as Buildgates® available from, inter alia, Cadence Design Systems, Inc., may be used. IEEE std. 1076.3-1997, IEEE Standard VHDL Synthesis Packages, describe an industry-accepted language for specifying a Hardware Description Language-based design and the synthesis capabilities that may be expected to be available to one of ordinary skill in the art.

Overview

The ARCtangent processor is a user-customizable 32-bit RISC core for ASIC, system-on-chip (SoC), and FPGA integration. It is synthesizable, configurable, and extendable, thus allowing developers to modify and extend the architecture to better suit specific applications. The ARCtangent microprocessor comprises a 32-bit RISC architecture with a four-stage execution pipeline. The instruction set, register file, condition codes, caches, buses, and other architectural features are user-configurable and extensible. It has a 32×32-bit core register file, which can be doubled if required by the application. Additionally, it is possible to use large number of auxiliary registers (up to 2E32). The functional elements of the core of this processor include the arithmetic logic unit (ALU), register file (e.g., 32×32), program counter (PC), instruction fetch (i-fetch) interface logic, as well as various stage latches.

ARCompact™ is an innovative instruction set architecture (ISA) that allows designers to mix 16 and 32-bit instructions on its 32-bit user-configurable processor. The key benefit of the ISA is the ability to cut memory requirements on a SoC (system-on-chip) by significant percentages, resulting in lower power consumption and lower cost devices in deeply embedded applications such as wireless communications and high volume consumer electronics products.

The main features of the ARCompact ISA include new 32-bit instructions aimed at providing better code density, a new set of 16-bit instructions for the most commonly used operations, and freeform mixing of 16- and 32-bit instructions without a mode switch—significant because it reduces the complexity of compiler usage compared to competing mode-switching architectures. The ARCompact instruction set expands the number of custom extension instructions that users can add to the base-case ARCtangent™ processor instruction set. The existing processor architecture already allows users to add as many as 69 new instructions to speed up critical routines and algorithms. With the ARCompact ISA, users can add as many as 256 new instructions. Users can also add new core registers, auxiliary registers, and condition codes. The ARCompact ISA thus maintains and expands the user-customizable features of ARC's configurable processor technology.

As 32-bit architectures become more widely used in deeply embedded systems, code density can have a direct impact on system cost. Typically, a very high percentage of the silicon area of a system-on-chip (SoC) is taken up by memory.

The ARCompact ISA delivers high density code helping to significantly reduce the memory required for the embedded application, a vital factor for high-volume consumer applications, such as flash memory cards. In addition, by fitting code into a smaller memory area, the processor potentially has to make fewer memory accesses. This can cut power consumption and extend battery life for portable devices such as MP3 players, digital cameras and wireless handsets. Additionally, the new, shorter instructions can improve system throughput by executing in a single clock cycle some operations previously requiring two or more instructions. This can boost application performance without having to run the processor at higher clock frequencies.

The support for freeform use of 16 and 32-bit instructions allows compilers and programmers to use the most suitable instructions for a given task, without any need for specific code partitioning or system mode management. Direct replacement of 32-bit instructions with new 16-bit instructions provides an immediate code density benefit, which can be realized at an individual instruction level throughout the application. As the compiler is not required to restructure the code, greater scope for optimizations is provided, over a larger range of instructions. Application debugging is more intuitive because the newly generated code follows the structure of the original source code.

Detailed description of the improved ISA used in, e.g., the ARCompact core is provided in co-pending U.S. Provisional Patent Application Serial No. 60/353,647 entitled "Configurable Data Processor With Multi-Length Instruction Set Architecture" filed Jan. 31, 2002, commonly owned by the Assignee hereof, and incorporated herein by reference in its entirety.

The extensibility of the aforementioned Tangent and Compact processor cores manufactured by the Assignee hereof allows them to be customized for particular applications. Applications involving FFT's can greatly benefit from such customization. When employing a user-configurable extensible data processor, the end application is known at the time of design/synthesis, and the user configuring the processor can apply the methods of the present invention to produce enhanced calculation capability and processor efficiency. The user can also advantageously configure the processor appropriately so that only the hardware resources required to perform the function are included, resulting in an architecture that is significantly more silicon efficient than fixed architecture digital signal processors (DSPs). For example, users of the present invention can produce a small gate count (<50K gates) data processor capable of performing rapid FFT butterfly calculations. The methodology disclosed herein extends to the compiler, instruction set simulator, and verification strategy.

However, it will be recognized that while the following description is cast in terms of the extensible Tangent/Compact processor cores, other processor types and configurations (extensible or otherwise) may be adapted to incorporate the various aspects of the invention as described herein.

Apparatus and Methods For Iterative Calculation

The enhanced performance provided by the present invention enables the device to calculate the FFT butterfly significantly faster than the same device no so equipped. Accordingly, devices fitted with the enhanced functionality of the invention can perform FFT butterfly calculations using fewer clock cycles, thereby allowing either (i) higher data rates with a fixed clock frequency; or (ii) lower power consumption via reduction of the clock frequency required to perform the coding operation. This type of improvement can have a profound beneficial impact, such as on the power dissipation of an integrated device such as, for example, an audio encoder, decoder, or test chip (such as a device using MPEG or Dolby™ processes), or a DSL modem chip.

The butterfly calculation is performed in the innermost loop of the FFT computation. The iteration therefore has to execute (N/2)*log2(N) times, where N is the number of points on which the FFT calculation operates. Accordingly, every extra cycle taken in performing the butterfly operation has a significant impact on the overall performance of the FFT. For instance, a 256-point FFT (i.e., N=256) that would require 15498 cycles in the 16-bit case, would require 16522 cycles in the 24-bit case. The present invention, by reducing the number of cycles required on the inner loop, reduce the total cycle count. With the 16-bit multiplier, the application of the invention saves two cycles (or 2×1024=2048 total). With the 24-bit multiplier, the invention saves three cycles (3192 total). With the dual 16-bit variant of the invention, three cycles are saved; however, if the requirement that the processor not stall when a mul or mac instruction writes back to a window register is imposed, at total seven (7) cycles are saved.

Figure 1B:
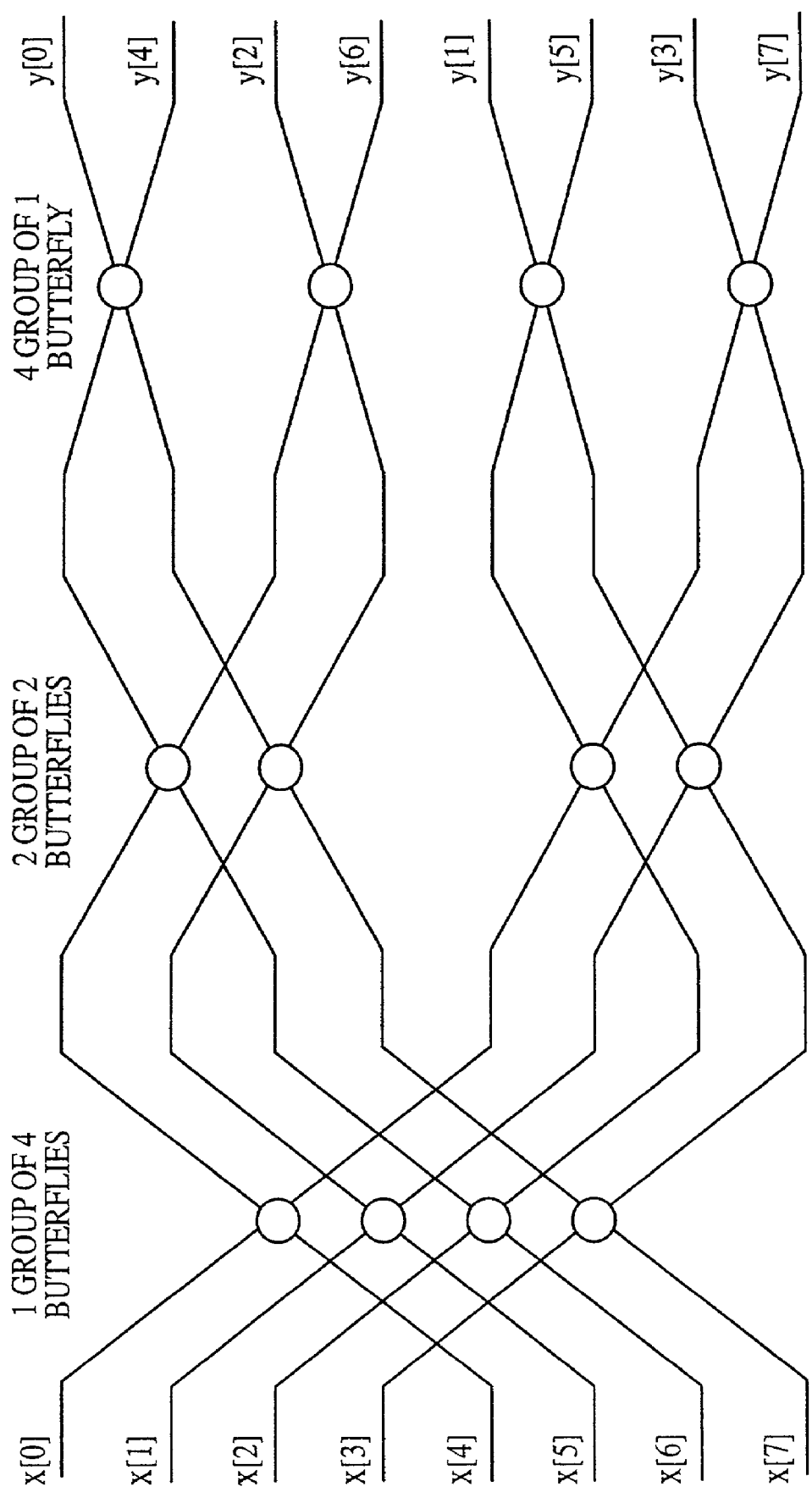
FIG. 1b is a logical diagram illustrating the grouping of FFT butterfly operations in an exemplary eight-point radix 2 DIT FFT calculation.

In the present invention, iterative calculations such as the FFT butterfly are significantly accelerated by: (i) removing the need for the aforementioned pipeline stall (described with respect to FIGS. 1a and 1b above); (ii) using the adder in the core accumulator rather than using "add" or "sub" instructions; and (iii) performing a load to the accumulator in parallel with another operation.

Figure 2:
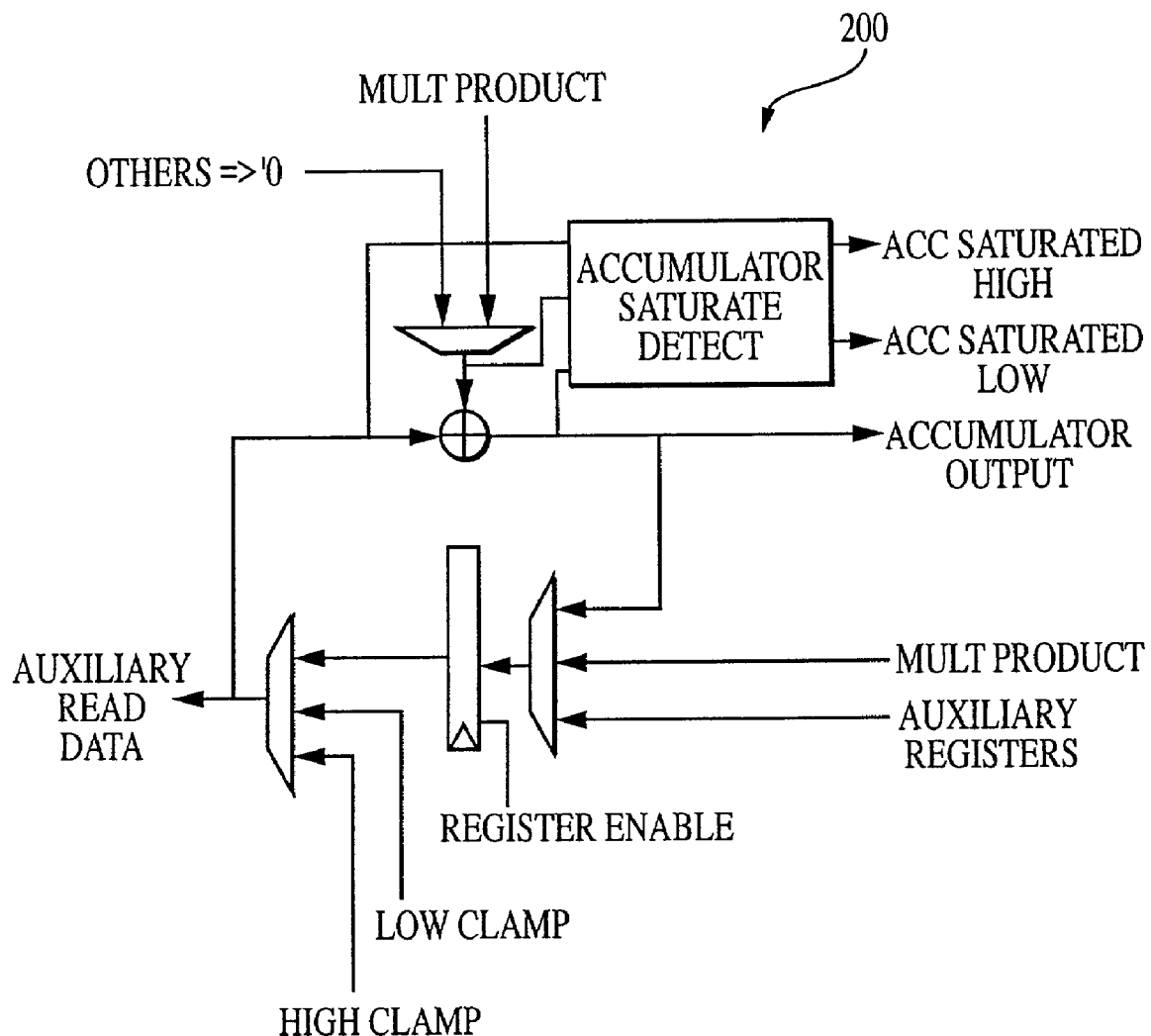
FIG. 2 is logical block diagram illustrating the accumulator and data path configuration associated with a typical extended multiply-accumulate (XMAC) instruction in an extensible processor.
Figure 3:
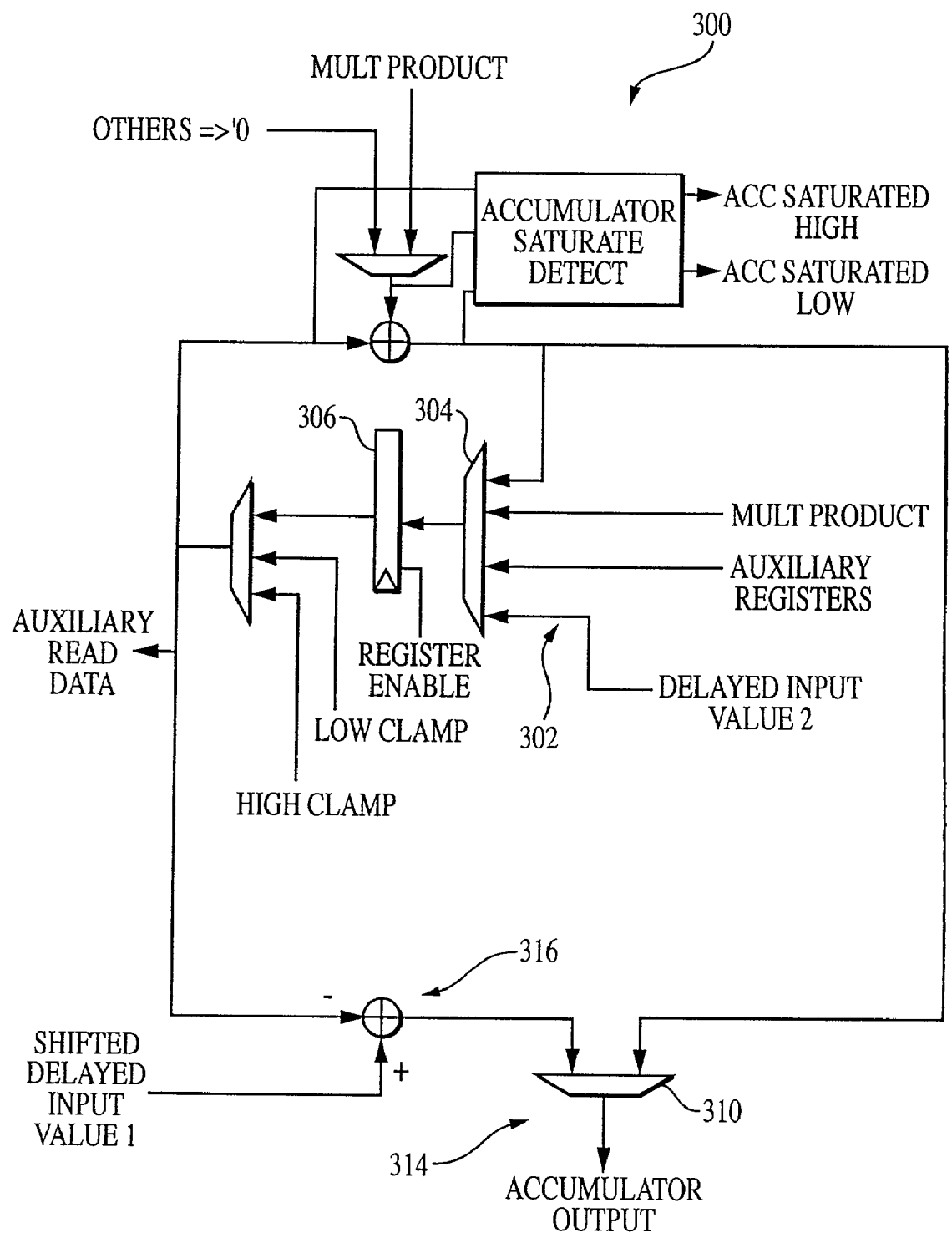
FIG. 3 is a logical block diagram illustrating one exemplary embodiment of the improved accumulator configuration and data paths of the present invention.

FIG. 3 illustrates the improved accumulator data path 300 of the invention adapted to perform the added extension instruction (e.g., FBF). In the present context, the FBF instruction comprises a 32-bit instruction word (with associated 32-bit registers), although it will be recognized that other instruction word/register configurations may be used. Note that as compared to the prior arrangement 200 shown in FIG. 2, the improved configuration 300 of FIG. 3 includes an additional pre-load input 302 to the multiplexer 304 that supplies the accumulator register 306. This additional input ("delayed input-value 2") 302 is used for the pre-load part of the FBF instruction operation. Additionally, the improved configuration of FIG. 3 includes an added output multiplexer 310 disposed at the output 314 of the accumulator. such that the output can be taken from an additional subtraction 316 via the multiplexer 310. This arrangement advantageously provides added efficiency as well as flexibility.

Figure 4:
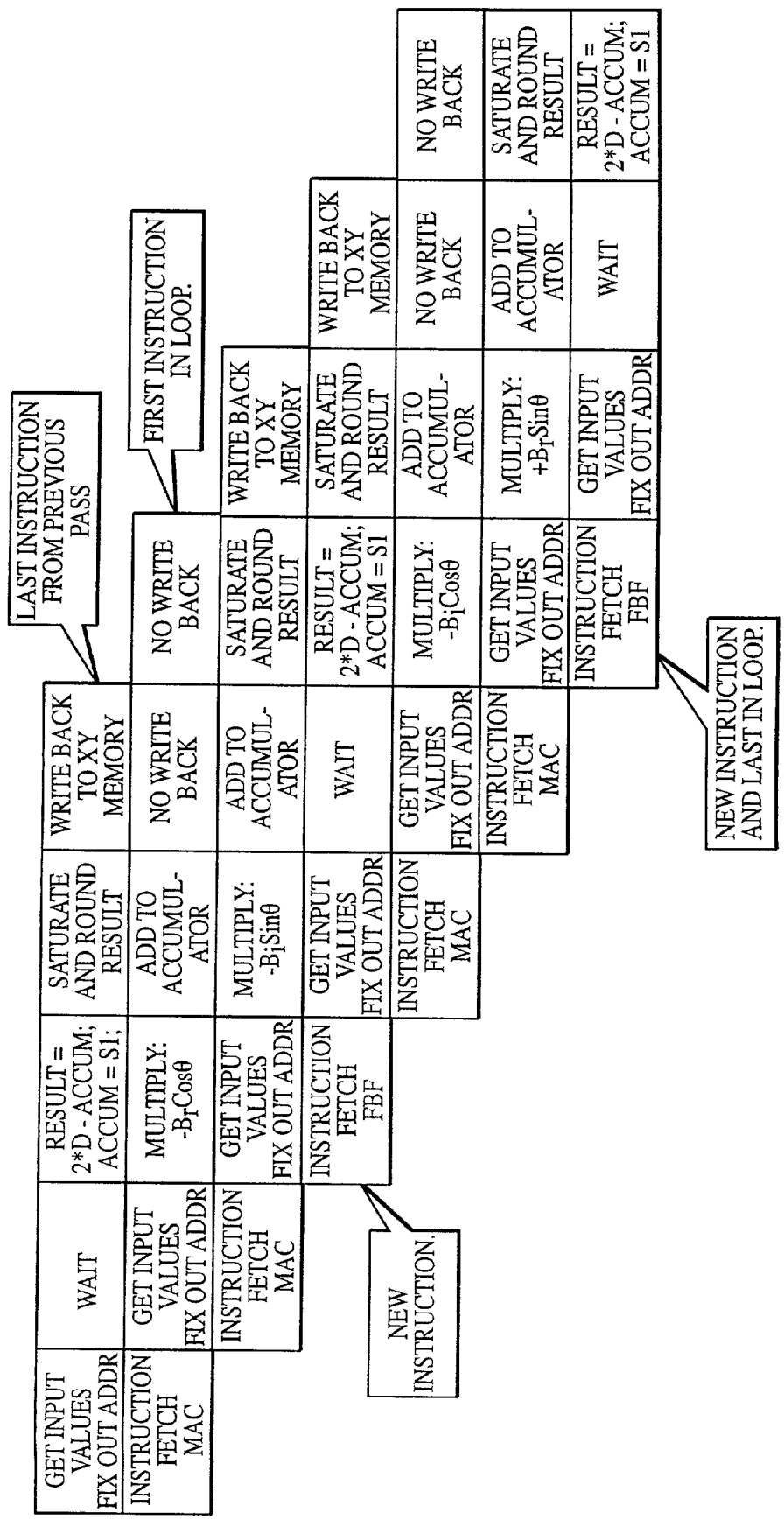
FIG. 4 is logical flow diagram illustrating the operation of the exemplary "FBF" instruction of the invention within the processor pipeline (16-bit embodiment).

FIG. 4 illustrates the operation of the FBF instruction and 16-bit accumulator configuration in the context of the aforementioned FFT butterfly calculation by detailing the function performed at each stage of the pipeline for all the instructions in the butterfly. Note that the FBF instruction of the present embodiment is advantageously pipelined to the same number of stages as the extension multiply-accumulate (XMAC) instructions. This approach assures that a pipeline stall will not occur, and a new instruction can be issued on each cycle. While the concept of slowing down an instruction using additional pipeline depth in order to accelerate the execution of the instruction appears somewhat counter-intuitive, the advantages provided by the approach of the present invention in terms of compatibility and parallelism within the pipeline more than offset any reduction in instruction execution speed. Additionally, it will be recognized that a new FBF, MUL, or MAC instruction can be issued on each cycle such that parallelism is maximized. Each stage in the extended instruction (FBF) of the invention can co-exist with the numerous (e.g., five, in the present embodiment) other instruction stages operating at the same time within the core.

The 16-bit embodiment advantageously comprises a two-operand instruction, which obviates the use of one of limited number of remaining three-operand instruction slots. At the appropriate point in the program, the FBF instruction simultaneously (i) subtracts the accumulator from twice the part of the A0 value to yield the A1 value; and (ii) preloads the accumulator with the other part of the next A0 value. See FIG. 1a. The result of these operations can then be processed using the same logic that the result of a multiply (MUL) or multiply-accumulate (MAC) operation would, and be written back to the appropriate window register.

Figure 5:
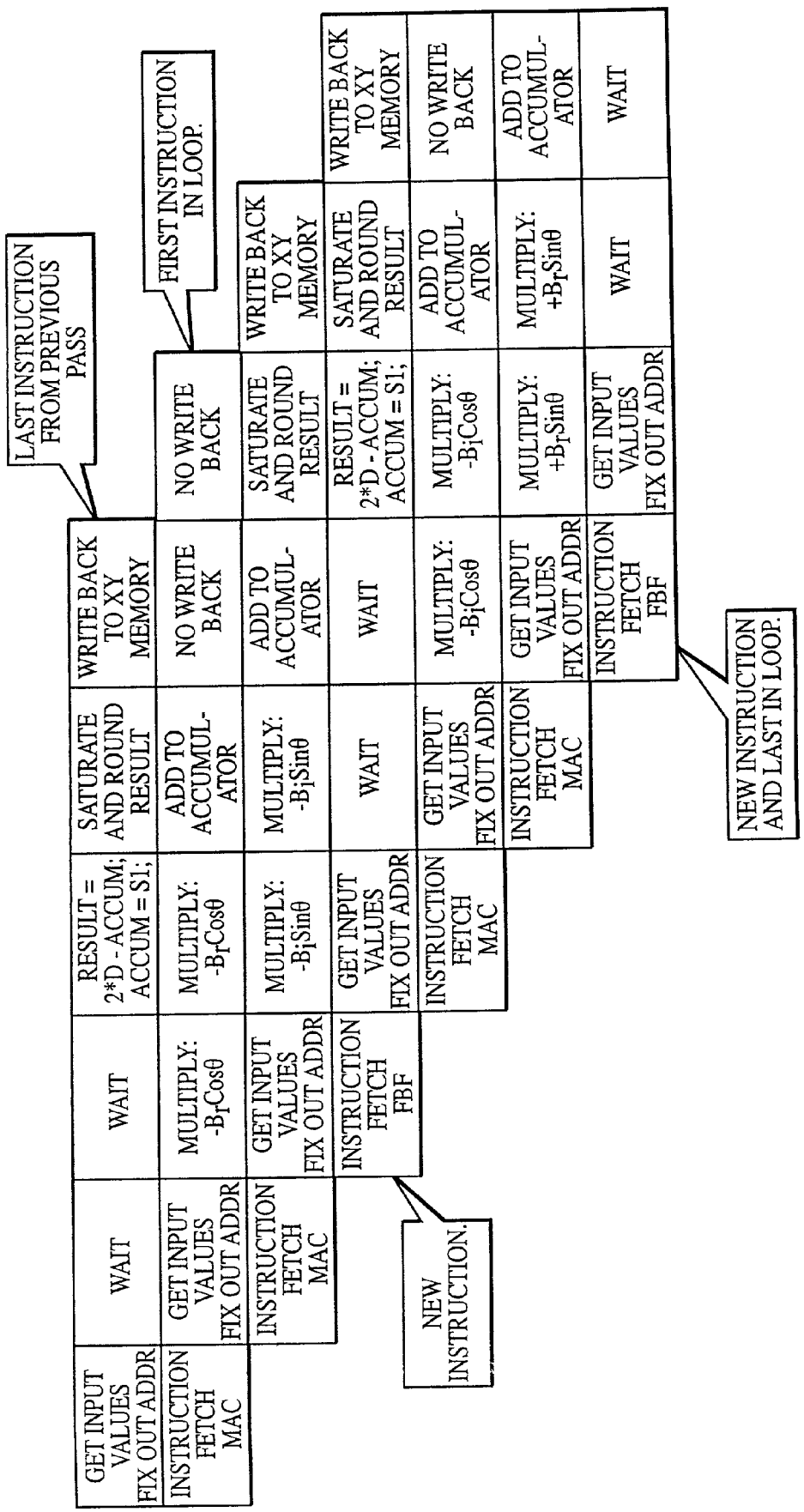
FIG. 5 is logical flow diagram illustrating the operation of the exemplary "FBF" instruction of the invention within the processor pipeline (24-bit embodiment).

FIG. 5 illustrates the operation of the 24-bit configuration and FBF instruction of the invention, which includes the extra cycle needed for the multiplication operation. Note that only 6 cycles are needed for the computation of the aforementioned FFT butterfly when using the 24-bit variant. The improvement in performance is most significant in the 24-bit embodiment due to the stall that would otherwise take place if not for the new instruction.

Figure 6:
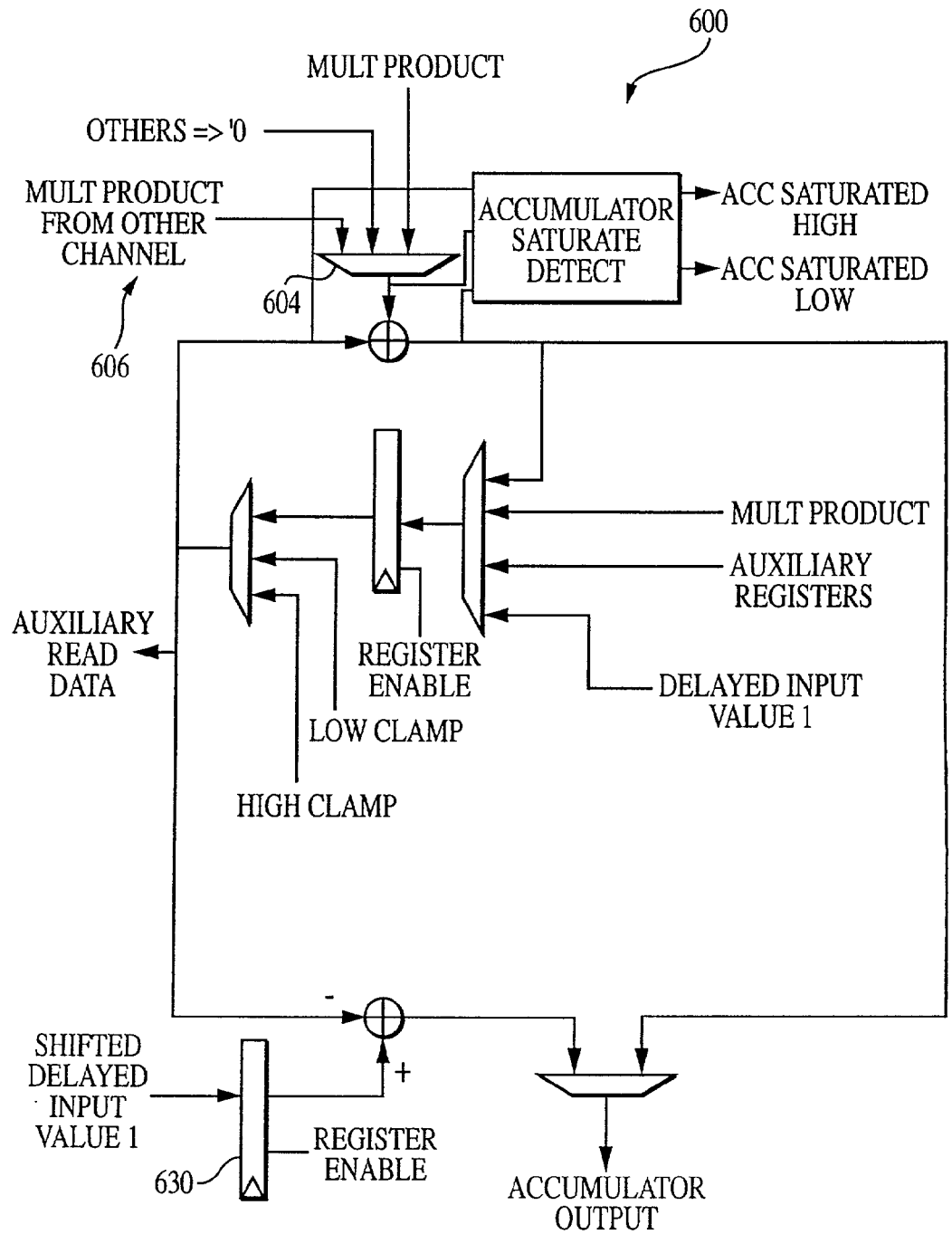
FIG. 6 is a logical block diagram illustrating a second embodiment of the improved accumulator configuration and data paths of the present invention, adapted for the dual 16-bit XMAC.

FIG. 6 illustrates another embodiment of the improved accumulator data path 600 of the invention adapted to perform dual 16-bit operations (multiplication) as part of the execution of the aforementioned extension instruction (e.g., FBF). In the embodiment of FIG. 6, each accumulator data path 600 further includes a separate register 630 which stores the input value from the previous FBF calculation, and provides this to the accumulator during the next subsequent FBF execution. The data path 600 further includes a modified multiplexer 604 having an input 606 comprising the multiplication product from the other channel's multiplier to permit swapping of the two multiply results (i.e., from the multiplier of each of two channels associated with the dual 16-bit words) during subsequent multiply-accumulate operations, as described in greater detail below.

FIG. 7 illustrates the operation of the dual 16-bit XMAC accumulator data path of FIG. 6 and associated FBF instruction. A significant improvement in performance for the FFT butterfly calculation is possible when using this dual 16-bit XMAC approach. Specifically, as shown in FIG. 7, the use of the dual 16-bit XMAC reduces the butterfly calculation to 3 cycles. However, this approach also requires a modification to the multiply accumulate instruction; specifically, after the FBF instruction has executed in the pipeline, the subsequent multiply-accumulate instruction must swap the two channels. Note that this requirement only effects the use of the MAC operation in the FFT calculation, as the added FBF instruction is expected to be used only in the context of the FFT. Alternatively, however, if the FBF is used outside the context of the FFT, the MAC operation may be configured accordingly, such configuration being within the skill of the ordinary artisan.

Additionally, the dual 16-bit embodiment of the invention (FIGS. 6 and 7) includes state information, in that it stores the source operand from the previous use of the instruction for use in the current use of the instruction (via the register 602 of FIG. 6). This storage of the source operand is performed because the FBF instruction requires both the old and new values for proper execution.

It is also noted that the present invention also contemplates the storage of one or more "key" algorithms, such as the FFT algorithms described above, in the instruction cache (not shown) or other local memory for ready access by the core. Additionally, the input data associated with these algorithms is readily contained in local static RAM (SRAM) or other storage device, thereby further reducing latency associated with read/write operations of such data.

Figure 8:
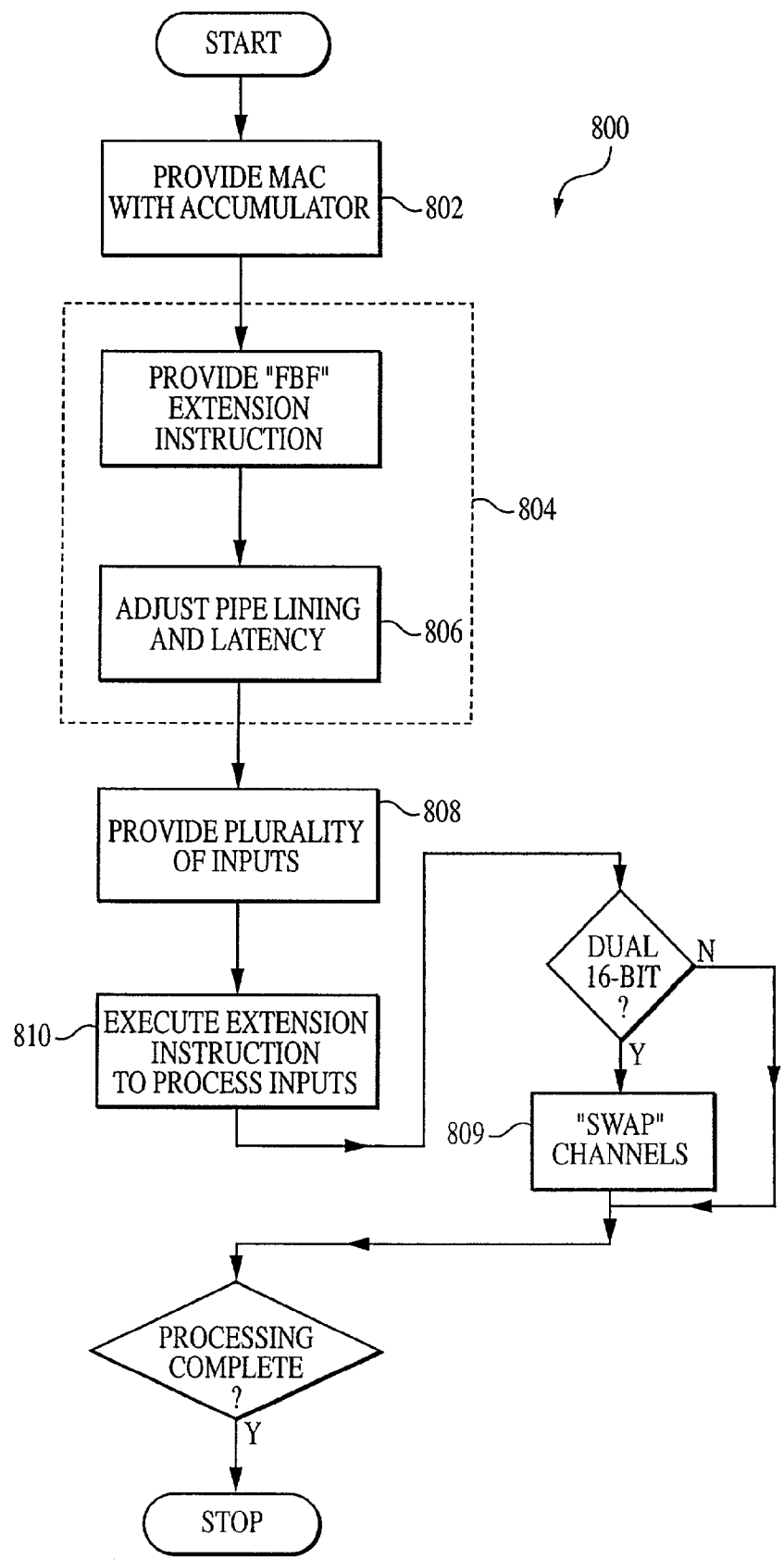
FIG. 8 is a logical flow diagram illustrating one embodiment of the improved method of performing calculations within a data processor according to the invention.

FIG. 8 illustrates generally the method of performing a multi-cycle calculation, such as the aforementioned FFT butterfly, within an extensible processor. The method 800 generally comprises providing at least one multiply-accumulate stage having at least one accumulator associated therewith (step 802); providing at least one extension instruction within the instruction set of the processor, the at least one extension instruction being adapted to perform loop calculations (step 804), pipelining the extension instruction to the same number of stages as the extension multiply-accumulate (XMAC) instructions of the instruction set so as to avoid stalling of the pipeline during execution (step 806); providing a plurality of inputs to said processor (step 808); and executing the extension instruction repeatedly (step 810) to produce the desired result of the multi-cycle calculation in a minimum number of cycles using the at least one accumulator. In the dual 16-bit embodiment, the method further comprises swapping the multiply results from the accumulators of the individual channels during a mac operation following the FBF instruction execution (step 809).

Method of Generating a Processor Design Adapted for Iterative Calculation

Figure 9:
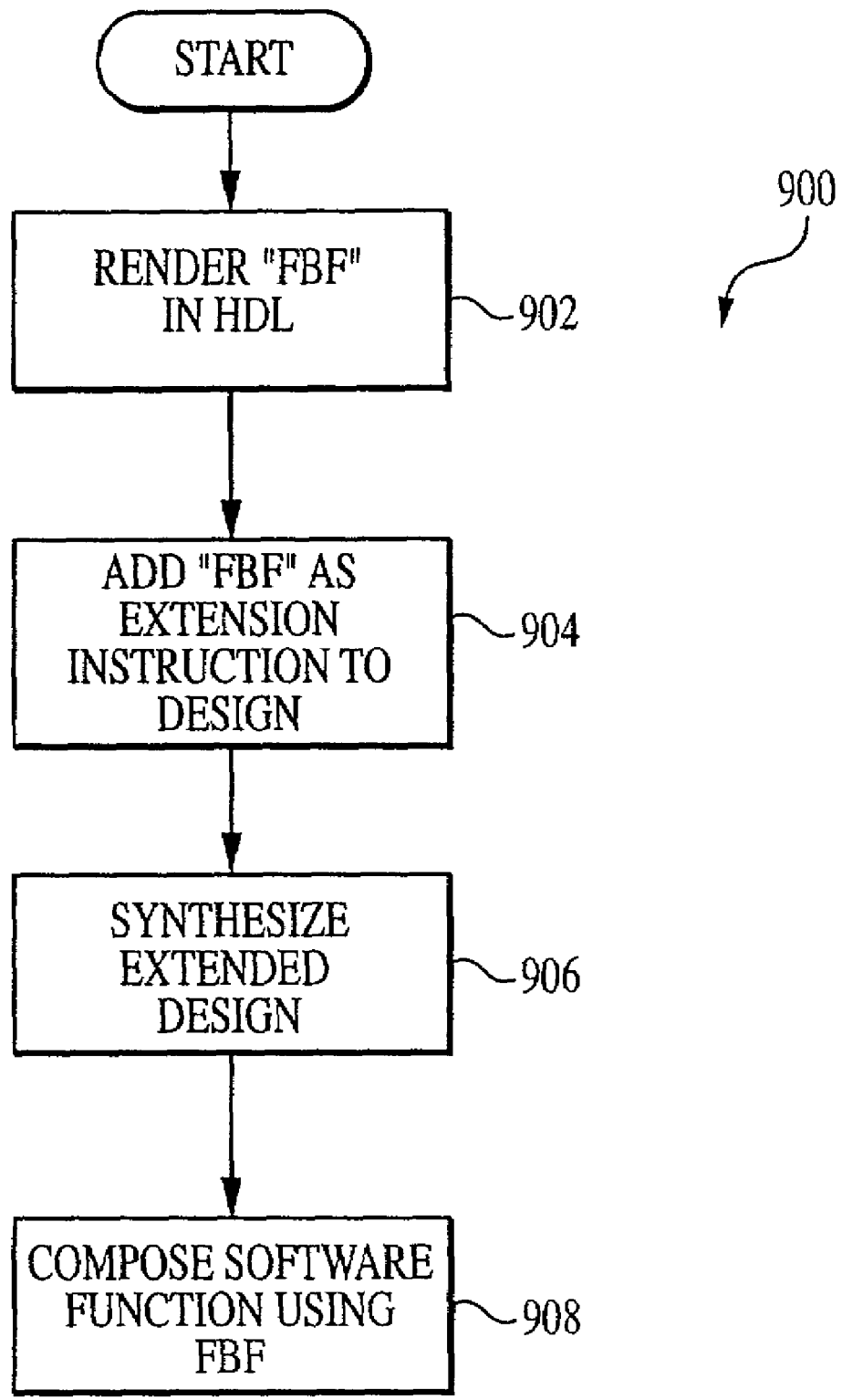
FIG. 9 is a logical block diagram illustrating one embodiment of the general method for generating a processor design specifically adapted for performing the method of FIG. 8.

Referring now to FIG. 9, the method of generating an extended digital processor design adapted for iterative calculations according to the present invention is described. It will be recognized that while the following methodology is described in terms of the well-known FFT "butterfly" algorithm, the invention may be more broadly applied to other types of algorithms and operations requiring looped or iterative calculations.

As shown in FIG. 9, the method 900 generally comprises first writing the FBF or comparable extension instruction in a hardware description language (HDL) such as that described below with reference to FIG. 10 (step 902). The format of the FBF instruction may be that previously described herein (e.g., 32-bit with 32-bit registers) depending on the processor configuration and desired functionality, or yet another format selected by the user. Next, in step 904, the FBF instruction rendered in HDL in step 902 is added as an extension instruction to the design of the configurable, extensible data processor (e.g., ARC™) previously described.

Next, in step 906, the extended data processor is synthesized using, e.g., an HDL compiler, to a target silicon technology such as a RISC processor, application specific integrated circuit (ASIC), or a field programmable gate array (FPGA). FIG. 10 (described in detail below) illustrates one exemplary embodiment of the method of synthesizing the design of the extended processor.

A software function is then written (step 908) that uses the aforementioned FBF instruction. Appendices I–III hereto provide exemplary pseudo-code implementing the 16-bit, 24-bit, and dual 16-bit embodiments of the FBF instruction, respectively.

Exemplary Method of Synthesizing

Figure 10:
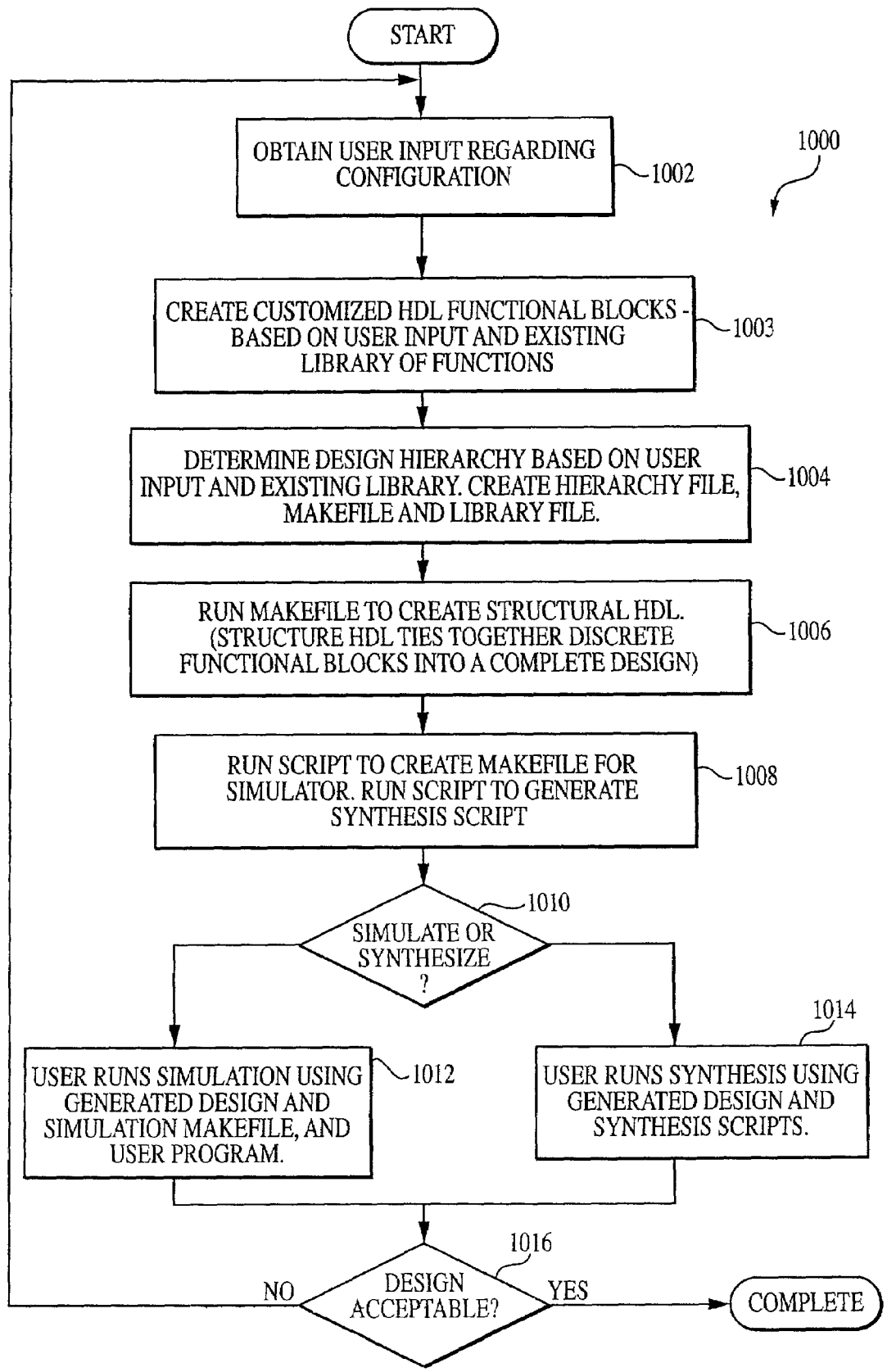
FIG. 10 is a logical block diagram illustrating one embodiment of the method of synthesizing the processor design as part of the method of FIG. 9.

Referring now to FIG. 10, one embodiment of the method 1000 of synthesizing logic incorporating the enhanced instruction functionality previously discussed herein is described. The generalized method of synthesizing integrated circuit logic having a user-customized (i.e., "soft") instruction set is disclosed in Applicant's U.S. patent application Ser. No. 09/418,663 entitled "Method And Apparatus For Managing The Configuration and Functionality of a Semiconductor Design" filed Oct. 14, 1999, now U.S. Pat. No 6,862,563, which claims the priority benefit of U.S. provisional application Ser. No. 60/104,271 of the same title filed Oct. 14, 1998, both of which are incorporated herein by reference in their entirety.

While the following description is presented in terms of an algorithm or computer program running on a microcomputer or other similar processing device, it can be appreciated that other hardware environments (including for example minicomputers, workstations, networked computers, "supercomputers", and mainframes) may be used to practice the method. Additionally, one or more portions of the computer program may be embodied in hardware or firmware as opposed to software if desired, such alternate embodiments being well within the skill of the computer artisan.

Initially, user input is obtained regarding the design configuration in the first step 1002. Specifically, desired modules or functions for the design are selected by the user, and instructions relating to the design are added, subtracted, or generated as necessary. For example, in signal processing applications, it is often advantageous for CPUs to include a single or even multiple "multiply and accumulate" (MAC) instructions. In the present invention, the instruction set of the synthesized design is modified so as to incorporate the foregoing FBF instruction and associated accumulator logic (or other comparable calculation acceleration functionality) therein.

The technology library location for each VHDL file is also defined by the user in step 1002. The technology library files in the present invention store all of the information related to cells necessary for the synthesis process, including for example logical function, input/output timing, and any associated constraints. In the present invention, each user can define his/her own library name and location(s), thereby adding further flexibility.

Next, in step 1003, the user creates customized HDL functional blocks based on the user's input and the existing library of functions specified in step 1002.

In step 1004, the design hierarchy is determined based on user input and the aforementioned library files. A hierarchy file, new library file, and makefile are subsequently generated based on the design hierarchy. The term "makefile" as used herein refers to the commonly used UNIX makefile function or similar function of a computer system well known to those of skill in the computer programming arts. The makefile function causes other programs or algorithms resident in the computer system to be executed in the specified order. In addition, it further specifies the names or locations of data files and other information necessary to the successful operation of the specified programs. It is noted, however, that the invention disclosed herein may utilize file structures other than the "makefile" type to produce the desired functionality.

In one embodiment of the makefile generation process of the present invention, the user is interactively asked via display prompts to input information relating to the desired design such as the type of "build" (e.g., overall device or system configuration), width of the external memory system data bus, different types of extensions such as the FBF extensions described previously herein, cache type/size, etc. Many other configurations and sources of input information may be used, however, consistent with the invention.

In step 1006, the user runs the makefile generated in step 1004 to create the structural HDL. This structural HDL ties the discrete functional block in the design together so as to make a complete design.

Next, in step 1008, the script generated in step 1006 is run to create a makefile for the simulator. The user also runs the script to generate a synthesis script in step 1008.

At this point in the program, a decision is made whether to synthesize or simulate the design (step 1010). If simulation is chosen, the user runs the simulation using the generated design and simulation makefile (and user program) in step 1012. Alternatively, if synthesis is chosen, the user runs the synthesis using the synthesis script(s) and generated design in step 1014. After completion of the synthesis/simulation scripts, the adequacy of the design is evaluated in step 1016. For example, a synthesis engine may create a specific physical layout of the design that meets the performance criteria of the overall design process yet does not meet the die size requirements. In this case, the designer will make changes to the control files, libraries, or other elements that can affect the die size. The resulting set of design information is then used to re-run the synthesis script.

If the generated design is acceptable, the design process is completed. If the design is not acceptable, the process steps beginning with step 1002 are re-performed until an acceptable design is achieved. In this fashion, the method 1000 is iterative.

Figure 11:
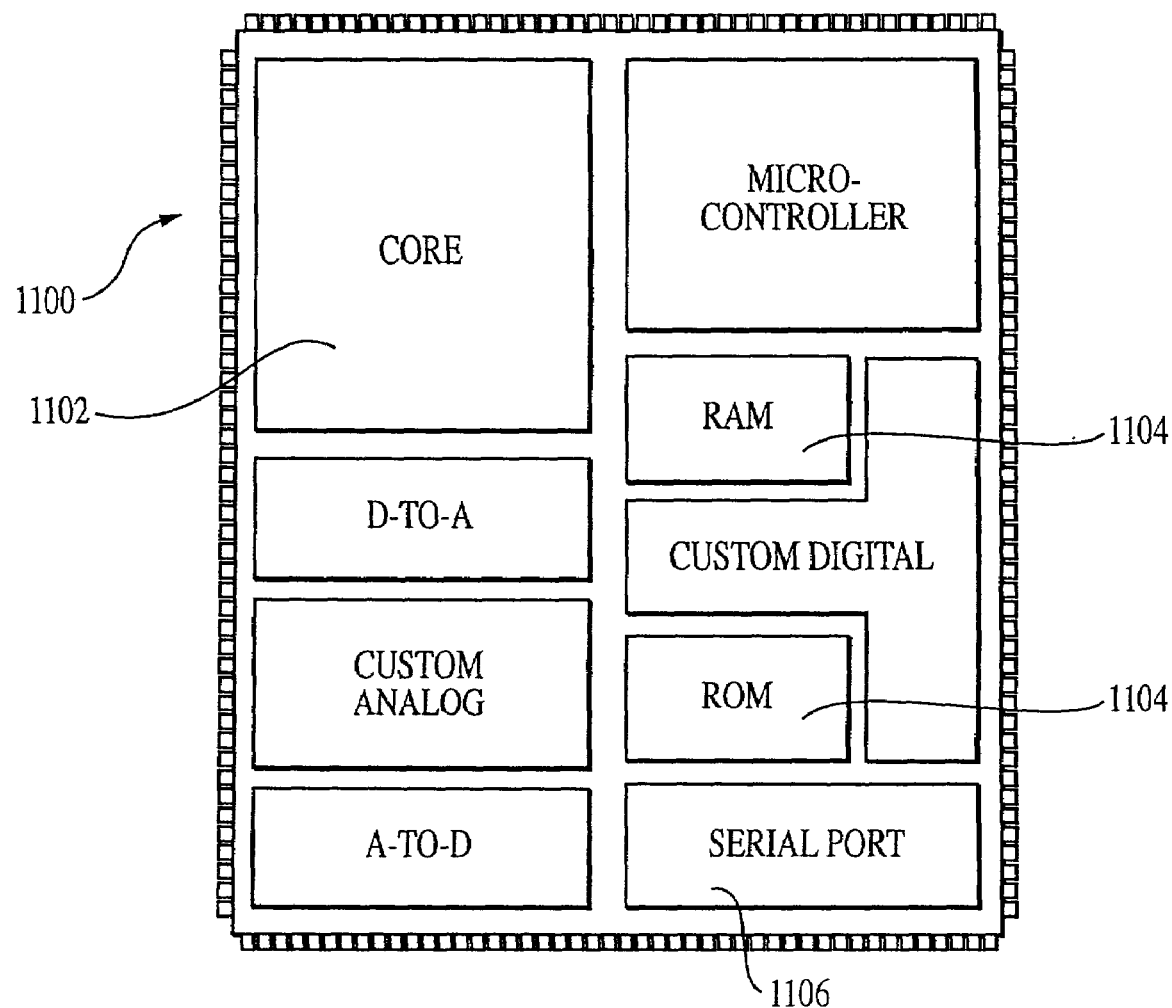
FIG. 11 is a block diagram of a pipelined processor design in the form of an integrated circuit (IC) package which incorporates the enhanced calculation functionality of the present invention.

FIG. 11 illustrates an exemplary pipelined extended processor integrated circuit which has been fabricated using a 1.0 um process. As shown in FIG. 11, the processor 1100 is an ARC microprocessor-like CPU device having, inter alia, a processor core 1100, on-chip "local" memory 1102, external interface 1110, and extension ALU (not shown). The device is fabricated using the customized VHDL design obtained using the method 1000 of the present invention, which is subsequently synthesized into a logic level representation, and then reduced to a physical device using compilation, layout and fabrication techniques well known in the semiconductor arts.

It will be appreciated by one skilled in the art that the processor of FIG. 11 may contain any commonly available peripheral such as serial communications devices, parallel ports, timers, counters, high current drivers, analog to digital (A/D) converters, digital to analog converters (D/A), interrupt processors, LCD drivers, memories and other similar devices. Further, the processor may also include custom or application specific circuitry. The present invention is not limited to the type, number or complexity of peripherals and other circuitry that may be combined using the method and apparatus. Rather, any limitations are imposed by the physical capacity of the extant semiconductor processes which improve over time. Therefore it is anticipated that the complexity and degree of integration possible employing the present invention will further increase as semiconductor processes improve.

It is also noted that many IC designs currently use a microprocessor core and a DSP core. The DSP however, might only be required for a limited number of DSP functions, or for the IC's fast DMA architecture. The invention disclosed herein can support many DSP instruction functions, and its fast local memory system advantageously provides immediate access to data. Appreciable cost savings may be realized by using the methods disclosed herein for both the CPU & DSP functions of the IC.

Additionally, it will be noted that the methodology (and associated computer program) as previously described herein can readily be adapted to newer manufacturing technologies, such as 0.18 or 0.1 micron processes, with a comparatively simple re-synthesis instead of the lengthy and expensive process typically required to adapt such technologies using "hard" macro prior art systems.

System for Synthesizing

Figure 12:
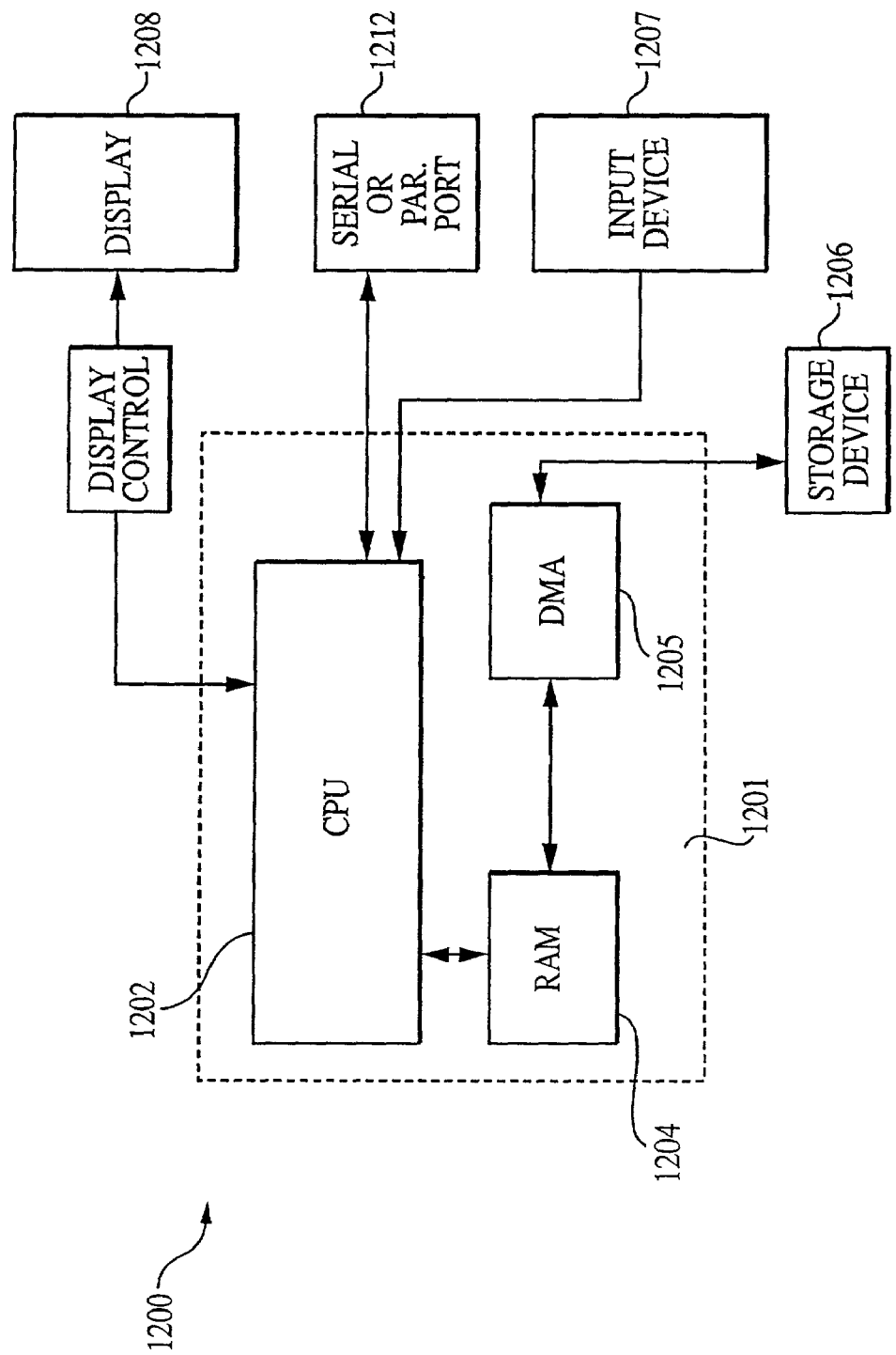
FIG. 12 is a functional block diagram of one exemplary embodiment of a computer system useful for synthesizing gate logic implementing the enhanced calculation functionality within the processor device of FIG. 11.

Referring now to FIG. 12, one embodiment of a computing device capable of synthesizing the extensible processor and associated logic structures (including the extension ALU and single-cycle decoding functionality discussed previously herein) is described. The computing device 1200 comprises a motherboard 1201 having a central processing unit (CPU) 1202, random access memory (RAM) 1204, and memory controller 1205. A storage device 1206 (such as a hard disk drive or CD-ROM), input device 1207 (such as a keyboard or mouse), and display device 1208 (such as a CRT, plasma, or TFT display), as well as buses necessary to support the operation of the host and peripheral components, are also provided. The aforementioned VHDL descriptions and synthesis engine are stored in the form of an object code representation of a computer program in the RAM 1204 and/or storage device 1206 for use by the CPU 1202 during design synthesis, the latter being well known in the computing arts. The user (not shown) synthesizes logic designs by inputting design configuration specifications into the synthesis program via the program displays and the input device 1207 during system operation. Synthesized designs generated by the program are stored in the storage device 1206 for later retrieval, displayed on the graphic display device 1208, or output to an external device such as a printer, data storage unit, other peripheral component via a serial or parallel port 1212 if desired.

It will be recognized that while certain aspects of the invention have been described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

Appendix I

©2001–2002 ARC International (UK) Limited. All rights reserved.

FBF 0, %x0_nu
LP end_bfy
MAC 0, %r9, %x1_nu
MAC %x1_u, %r8, %y1_u
FBF %x0_u, %y0_nu
MAC 0, %r9, %y1_nu
MAC
%y1_u, %r7, %x1_nu
%r9=−Cosθ
%r8=−Sinθ
%r7=+Sinθ
%x0=$A_r$
%y0=$A_I$
%x1=$B_r$
%y1=$B_I$ Appendix II ©2001–2002 ARC International (UK) Limited. All rights reserved.

FBF 0, %x0_nu
LP end_bfy
MAC 0, % r9, %x1_nu
MAC %x1_u, %r8, %y1_u
FBF %x0_u, %y0_nu
MAC 0, %r9, %y1_nu
MAC %y1_u, %r7, %x1_nu
FBF %y0_u, %x0_nu
end_bfy:
%r9=−Cosθ
%r8=−Sinθ
%r7=+Sinθ
%x0=$A_r$
%y0=$A_I$
%x1=$B_r$
%y1=$B_I$ Appendix III ©2001–2002 ARC International (UK) Limited. All rights reserved.

FBF 0, %x0_nu
LP end_bfy
MAC 0, %r7, %x1_nu
MAC %x0_u, %r6, %x1_nu
FBF %x1_u, %x0_nu
end_bfy:
%r6=+Cosθ, +Cosθ
%r7=+Sinθ, −Sinθ
%x0=$A_I$, $A_r$
%x1=$B_I$, $B_r$

We claim:

1. A user-extensible pipelined processor adapted for performing iterative calculations on a plurality of data, said processor having an extension instruction set associated therewith, and comprising:
    at least one multiply-accumulate apparatus having at least one accumulator associated therewith;
    at least one register window;
    at least one extension instruction provided within said extension instruction set, said at least one extension instruction being adapted to:
        (i) subtract a value present in said at least one accumulator from a multiple of a first one of said plurality of data; and
        (ii) preload said at least one accumulator with a second one of said plurality of data; and
    logic operatively connected to said at least one multiply-accumulate apparatus and adapted to write back the result of said subtraction to said register window.

2. The processor of claim 1, wherein said value present in said at least one accumulator is loaded in parallel with at least one other operation.

3. The processor of claim 1, wherein said extension instruction set further includes at least one multiply-accumulate instruction, and said at least one extension instruction is pipelined to the same number of stages as said at least one multiply-accumulate instruction to avoid stalling of the pipeline during execution.

4. The processor of claim 1, wherein said at least one extension instruction comprises an instruction adapted to perform at least a portion of an FFT butterfly calculation.

5. The processor of claim 4, wherein said at least one accumulator comprises 16-bits, and said extension instruction comprises two operands.

6. The processor of claim 4, wherein said at least one accumulator comprises 24-bits.

7. The processor of claim 4, wherein said instruction comprises a 32-bit instruction word utilizing three inputs to generate two outputs.

8. The processor of claim 7, wherein one of said three inputs comprises a twiddle factor, said twiddle factor being derived at least in part from a table disposed in a storage device associated with said processor.

9. The processor of claim 7, wherein one of said three inputs comprises a twiddle factor, said twiddle factor being of the form cos θ+j * sin θ.

10. The processor of claim 7, wherein said at least one extension instruction utilizes pairs of data blocks as inputs, at least two of said inputs comprising data obtained sequentially from different data blocks.

11. A pipelined digital processor adapted for performing iterative calculations on a plurality of data, said processor having an instruction set with at least one extension instruction, said at least one extension instruction adapted for FFT butterfly calculation, the processor comprising:
  at least one multiply-accumulate stage having at least one accumulator associated therewith;
  at least one register window; and
  write-back logic operatively connected to said at least one multiply-accumulate stage;
  wherein said at least one extension instruction being adapted to:
    (i) subtract a value present in said at least one accumulator from a multiple of a first one of said plurality of data;
    (ii) preload said at least one accumulator with a second one of said plurality of data; and
    (iii) cooperate with said logic to write back the result of said subtraction to said window register.

12. The processor of claim 11, wherein said extension instruction set further includes at least one multiply-accumulate instruction, and said at least one extension instruction is pipelined to the same number of stages as said at least one multiply-accumulate instruction to avoid stalling of the pipeline during execution.

13. An extensible processor adapted for performing iterative calculations on a plurality of data, said processor having a multi-stage instruction pipeline and an extension instruction set, comprising:
  at least one multiply-accumulate apparatus having at least one accumulator associated therewith;
  at least one first extension instruction being adapted to perform at least a portion of an iterative calculation on said plurality of data; and
  at least one second extension instruction adapted to perform a multiply or multiply-accumulate operation using said at least one multiply accumulate apparatus and accumulator;
  wherein said at least one first extension instruction is pipelined to the same number of stages as said at least one second extension instruction, thereby avoiding pipeline stalling during processing of said at least one first instruction.

14. A user-extensible processor adapted for performing iterative calculations on a plurality of data, said processor having a multi-stage instruction pipeline and an extension instruction set, comprising:
  at least one multiply-accumulate apparatus having at least one accumulator associated therewith;
  at least one first extension instruction being adapted to perform at least a portion of an iterative calculation on said plurality of data; and
  at least one second extension instruction adapted to perform a multiply or multiply-accumulate operation using said at least one multiply accumulate apparatus and accumulator;
  wherein the propagation of said at least one first extension instruction within said pipeline is controlled at least in part through added pipeline depth, said added pipeline depth providing for reduced execution time of said at least one first extension instruction.

15. A method of performing an iterative calculation using a user-configurable, extensible processor having an instruction set, pipeline, and at least one multiply-accumulate apparatus with accumulator, the method comprising:
  inserting a first extension instruction into said pipeline, said first instruction adapted to:
    (i) subtract a value present in said at least one accumulator from a multiple of a first input value;
    (ii) preload said at least one accumulator with a second input value; and
    (iii) write back the result of the aforementioned subtraction operation to a designated register location;
  providing a plurality of inputs to said at least one multiply-accumulate apparatus said plurality of inputs comprising at least said first and second inputs; and
  executing said first extension instruction to produce at least one output from said at least one multiply-accumulate apparatus.

16. The method of claim 15, wherein said act of inserting comprises inserting an extension instruction adapted to perform FFT butterfly operations.

17. The method of claim 15, further comprising pipelining the first extension instruction to the same number of stages as a corresponding multiply-accumulate instruction of said instruction set so as to avoid stalling of the pipeline during execution of said first extension instruction.

18. A method of configuring a processor to perform an iterative calculation, said processor having an instruction set, pipeline, and at least one multiply-accumulate apparatus, said method comprising:
  synthesizing said processor at least in part using the method comprising:
    (i) providing a first extension instruction in a hardware description language (HDL), said first extension instruction being adapted to utilize existing logic within said processor related to other instructions within said instruction set,
    (ii) adding said first extension instruction to the design of extended data processor; and
    (iii) synthesizing the extended processor design including said first extension instruction, said first extension instruction being pipelined to the same number of stages as at least one of said other instructions; and
  inserting said first extension instruction into said pipeline;
  providing a plurality of inputs to said at least one multiply-accumulate apparatus; and
  executing said first extension instruction to produce at least one output from said at least one multiply-accumulate apparatus.

19. The method of claim 18, wherein said processor comprises at least two multiply accumulate stage channels, the method further comprising swapping a plurality of multiply results from said at least two multiply-accumulate apparatuses during a multiply-accumulate operation following said executing of said first extension instruction.

20. An integrated circuit device optimized for performing iterative calculations on input data, comprising:
  at least one silicon die having a plurality of circuit features formed thereon; and
  an extended processor having a multi-stage instruction pipeline and an extension instruction set, comprising:
    at least one multiply-accumulate apparatus having at least one accumulator associated therewith;
    at least one first extension instruction being adapted to perform at least a portion of an iterative calculation on said plurality of data; and
    at least one second extension instruction adapted to perform a multiply or multiply-accumulate operation using said at least one multiply accumulate apparatus and accumulator;
    wherein said at least one first extension instruction is pipelined to the same number of stages as said at least one second extension instruction, thereby avoiding pipeline stalling during processing of said at least one first instruction.

21. The integrated circuit of claim 20, wherein said device is adapted for performance of FFT butterfly calculations.

22. The integrated circuit of claim 20, wherein said device is optimized for reduced power consumption based at least in part on use of a reduced clock speed.

23. A digital processor adapted for performing iterative calculations, comprising:
   a multistage instruction pipeline; and
   an accumulator in signal communication with said pipeline, said accumulator comprising:
      an adder having first and second inputs, said second input being operatively coupled to a first multiplier, said adder adapted to add said inputs to produce at least one output;
      a first multiplexer adapted to multiplex a plurality of inputs onto at least one output; at least one of said plurality of inputs comprising at least one of said at least one outputs of said adder, at least one of said plurality of inputs of said first multiplexer comprising a pre-load signal associated with a butterfly operation; and
      at least one register operatively coupled to said at least one output of said first multiplexer and said first input of said adder.

24. The processor of claim 23, wherein said accumulator further comprises:
   a subtractor having at least a first input coupled to said at least one register; and
   a second multiplexer having the outputs of said adder and said subtractor as inputs thereto.

25. The processor of claim 24, wherein said accumulator further comprises:
   a second register operatively coupled to an input of said subtractor;
   a third multiplexer having:
      (i) a plurality of inputs, at least one of said inputs comprising a multiplier product from a second multiplier; and
      (ii) an output operatively coupled to said second input of said adder;
   wherein said third multiplexer is adapted to switch inputs to said accumulator between said first and second multipliers.

26. The processor of claim 23, wherein said processor comprises at least one extension instruction, said at least one extension instruction being adapted to:
   subtract a value present in said accumulator from a multiple of a first one of said plurality of data; and
   preload said accumulator with a second one of said plurality of data.

27. The processor of claim 26, further comprising logic adapted to write back the result of said subtraction to a register window.

28. A user-configured and extended pipelined processor adapted for performing iterative calculations on a plurality of data, said processor having an extension instruction set associated therewith, and comprising:
   at least one multiply-accumulate apparatus having at least one accumulator associated therewith;
   at least one register window;
   at least one extension instruction provided within said extension instruction set, said at least one extension instruction being adapted to:
      (i) subtract a value present in said at least one accumulator from a multiple of a first one of said plurality of data; and
      (ii) preload said at least one accumulator with a second one of said plurality of data; and
   logic operatively connected to said at least one multiply-accumulate apparatus and adapted to write back the result of said subtraction to said register window.

29. The processor of claim 28, wherein said processor is user-configured and extended according to the process comprising:
   receiving one or more inputs from a user for at least one customized parameter of the processor;
   providing at least one prototype description and at least one extension logic description for the processor; and
   generating through an automated process a customized description language model based on the at least one customized parameter, the at least one prototype description, and the at least one extension logic description.

30. The processor of claim 29, wherein said process further comprises:
   reading the at least one prototype description; and
   modifying the at least one prototype description by substituting values in the at least one prototype description or merging additional descriptions based on the at least one customized parameter.

31. A user-configured and user-extended pipelined processor adapted for performing FFT butterfly calculations on a plurality of data, said processor having a base instruction set and an extension instruction set associated therewith, said processor comprising:
   at least one dual 16-bit multiply-accumulate apparatus having at least one accumulator associated therewith;
   at least one register window; and
   at least one extension instruction included within said extension instruction set based on a selection thereof by said user, said at least one extension instruction being adapted to:
      subtract a value present in said at least one accumulator from a multiple of a first one of said plurality of data; and
      preload said at least one accumulator with a second one of said plurality of data;
   wherein said FFT butterfly calculation comprises three machine cycles.

* * * * *